US008628747B2

(12) United States Patent
Zachariah et al.

(10) Patent No.: US 8,628,747 B2
(45) Date of Patent: Jan. 14, 2014

(54) CARBON NANOTUBE STRUCTURES FORMED ON LARGE FREE FLOATING SUBSTRATES

(75) Inventors: Michael R. Zachariah, Potomac, MD (US); Soo H. Kim, Miryang-si (KR)

(73) Assignee: University of Maryland College Park, College Park, MD (US)

( * ) Notice: Subject to any disclaimer, the term of this patent is extended or adjusted under 35 U.S.C. 154(b) by 818 days.

(21) Appl. No.: 11/962,130

(22) Filed: Dec. 21, 2007

(65) Prior Publication Data

US 2008/0280136 A1    Nov. 13, 2008

Related U.S. Application Data

(63) Continuation of application No. PCT/US2006/025591, filed on Jun. 30, 2006.

(60) Provisional application No. 60/697,319, filed on Jul. 7, 2005.

(51) Int. Cl.
*D01F 9/12* (2006.01)

(52) U.S. Cl.
USPC ............... 423/447.1; 423/447.2; 977/752

(58) Field of Classification Search
USPC ............ 423/447.1, 447.2, 447.3, 447.5, 461; 977/742, 843, 845, 752; 428/367
See application file for complete search history.

(56) References Cited

U.S. PATENT DOCUMENTS

| | | | |
|---|---|---|---|
| 2004/0151835 A1 | 8/2004 | Croci et al. | |
| 2004/0197638 A1 | 10/2004 | McElrath et al. | |
| 2005/0063891 A1* | 3/2005 | Shaffer et al. | 423/447.3 |
| 2005/0123467 A1* | 6/2005 | Harutyunyan | 423/447.1 |
| 2005/0261141 A1* | 11/2005 | Iso et al. | 508/154 |
| 2006/0039849 A1* | 2/2006 | Resasco et al. | 423/447.3 |
| 2006/0040832 A1* | 2/2006 | Zhang et al. | 508/113 |
| 2006/0067871 A1* | 3/2006 | Hart et al. | 423/447.3 |
| 2006/0104890 A1* | 5/2006 | Harutyunyan et al. | 423/447.3 |

FOREIGN PATENT DOCUMENTS

| | | | |
|---|---|---|---|
| CA | 2451080 A1 * | 1/2003 | |
| WO | WO /02/092506 | * 11/2002 | |
| WO | WO 03/004410 A1 * | 1/2003 | |

OTHER PUBLICATIONS

Cheung, et al. "Diameter-Controled Synthesis of Carbon Nanotubes." Department of Chemistry and Chemical Biology (2002): 2429-2433.

Sato, et al., "Growth of Diameter-Controlled Carbon Nanotubes Using Monodisperse Nickel Nanoparticles Obtained with a Differential Mobility Analyzer." Fujitsu Limited (2003): 361-366.

* cited by examiner

*Primary Examiner* — Melvin C Mayes
*Assistant Examiner* — Melissa Stalder
(74) *Attorney, Agent, or Firm* — William C. Schrot; AuerbachSchrot LLC

(57) ABSTRACT

Carbon nanotube structures are formed by providing metal composite particles including a catalyst metal and a non-catalyst metal, where the catalyst metal catalyzes the decomposition of a hydrocarbon compound and the formation of carbon nanotube structures on surfaces of the particles. The metal composite particles are combined with the hydrocarbon compound in a heated environment so as to form carbon nanotube structures on the surfaces of the metal composite particles. The metal composite particles can be include iron and aluminum at varying amounts. The carbon nanotubes formed on the metal particles can remain on the metal particles or, alternatively, be removed from the metal particles for use in different applications.

20 Claims, 5 Drawing Sheets

CARBON NANOTUBE STRUCTURES FORMED ON LARGE FREE FLOATING SUBSTRATES

CROSS REFERENCE TO RELATED APPLICATION

This application is a continuation of PCT Application PCT/US2006/025591, filed Jun. 30, 2006, entitled "Carbon Nanotube Structures Formed on Large Free Floating Substrates", which claims priority from U.S. Provisional Patent Application Ser. No. 60/697,319, entitled "Formation of Carbon Nanotubes On Large Free Floating Structures," filed Jul. 7, 2005. The disclosures of these patent applications are incorporated herein by reference in their entireties.

GOVERNMENT INTERESTS

This invention was made with Government support under Government Contract Number NIST 70NANB3H1140 awarded by National Institute of Standards and Technology, and the Government has certain rights in the invention.

FIELD OF THE INVENTION

The present invention relates to the formation of carbon nanotube structures formed on free floating substrates, in particular metal aerosol particulate substrates.

BACKGROUND

Carbon nanotubes (CNTs) are cylidrical tubes of carbon molecules formed entirely of Sp bonds that are similar to the carbon bonds in graphite. The electrical and mechanical properties of CNTs render these structures potentially useful for a number of applications in fields such as nanotechnology, electronics and structural materials.

A number of techniques have been developed to produce CNTs, with an increasing focus and effort in maximizing production of high quality CNTs having sufficiently low levels of impurities. Examples of known CNT production techniques include arc discharge, laser ablation, high pressure carbon monoxide (HiPco), and chemical vapor deposition (CVD).

In certain methods, CNTs are formed on a supporting transition metal surface upon diffusion of catalytically formed carbon atoms and subsequent nucleation and growth on the surface. For example, in a CVD process, a carbon-containing gas (e.g., acetylene, ethylene or ethanol) is reacted with metal catalyst particles or a metal catalyst substrate (typically iron, nickel or cobalt) at sufficiently high temperatures (e.g., at about 600° C. or greater) to facilitate growth of CNTs on the metal catalyst particles. The metal catalysts not only play a major role of supporting the growth of CNTs, but can also be used to control the diameter of as-grown CNTs. See, e.g., Cheung, C. L. et al., *J. Phys. Chem. B* 106, 2429 (2002); and Sato, S. et al., *Chem. Phys. Lett.* 382, 361 (2003).

The growth of CNTs can take place either on a fixed substrate or in a gas phase using free floating catalysts. For substrate-based growth of CNTs, metal oxide substrates have been used to disperse metal catalysts, where the catalytic properties of metal particles strongly depend upon the interactions between the substrate and the metal particles. In order to minimize the interactions, methods have been developed in which various oxide materials, such as silica and alumina, are inserted between the substrate and the metal particles to achieve a higher yield of CNTs.

Various gas-phase CNT production methods (also referred to as floating catalyst methods), such as laser ablation, wet/dry chemistry and HiPco methods, have been developed in efforts to achieve continuous production of CNTs. However, these processes can involve expensive fabrication approaches (e.g., laser ablation), complex physical conditions (e.g., requiring high pressure conditions of as much as 10 atm or greater) and/or complex chemical processes (e.g., wet/dry chemistry) to produce metal catalysts. In addition, a by-product of trying to increase yield in these processes often results in soot formation. In particular, hydrocarbons are directly decomposed into amorphous carbon at a CNT growth temperature of about 800° C., which can result in a coating of the nanotubes with amorphous carbon (which then necessitates removal of the coating in a subsequent step).

Further, the formation of free-floating CNTs can lead to agglomeration, particularly at high production rates, and the possibility of release of highly mobile aerosols to the environment with potentially adverse environmental and health effects.

Accordingly, it is desirable to provide simple, safe and cost effective methods for producing highly pure CNTs of substantially uniform diameter on the surfaces of metal catalyst particles.

SUMMARY

The present invention provides safe and improved methods for the continuous production of CNTs on the surface of large free-floating metal catalyst particles, where the CNTs are highly dense, substantially pure (i.e., substantially free of soot or other amorphous carbon impurities) and substantially uniform in diameter.

In accordance with the present invention, a method of forming carbon nanotube structures comprises providing metal composite particles including a catalyst metal and a non-catalyst metal, where the catalyst metal catalyzes the decomposition of a hydrocarbon compound and the formation of carbon nanotube structures on surfaces of the particles. The method further comprises combining the metal composite particles with the hydrocarbon compound in a heated environment so as to form carbon nanotube structures on the surfaces of the metal composite particles. In an exemplary embodiment, the catalyst metal comprises iron and the non-catalyst metal comprises aluminum, such that the metal composite particles formed are Fe/Al particles.

In accordance with another embodiment of the invention, a carbon nanotube material comprises a metal composite particle including a catalyst metal and a non-catalyst metal, where the catalyst metal catalyzes the decomposition of a hydrocarbon compound and the formation of carbon nanotube structures on surface of the particle. The material further comprises carbon nanotube structures formed on the surface of the metal composite particle.

The metal composite/carbon nanotube structures formed can be used for a variety of different applications. In addition, methods are provided for achieving release and separation of the carbon nanotubes from the composite metal particles, where the carbon nanotubes formed can also be used for different applications.

The above and still further features and advantages of the present invention will become apparent upon consideration of the following detailed description of specific embodiments thereof, particularly when taken in conjunction with the accompanying drawings.

DETAILED DESCRIPTION

Figure 1:
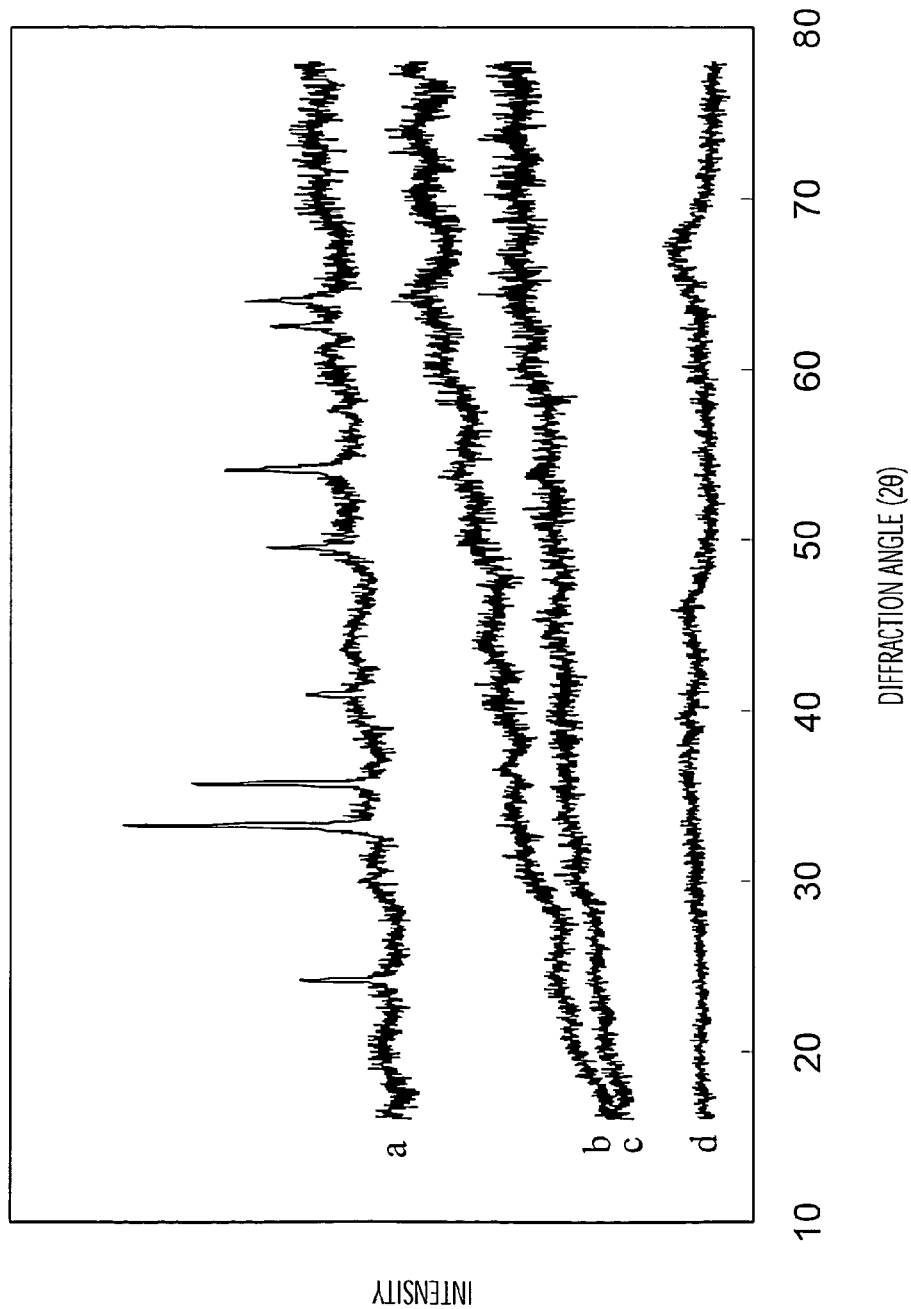
FIG. 1 is a plot of X-ray diffraction spectra for metal oxide particles of iron, metal oxide particles of aluminum, and metal composites of iron and aluminum oxides.

In accordance with the present invention, a simple and inexpensive method is provided for the continuous production of carbon nanotube (CNT) structures on the surfaces of large, free-flowing metal composite catalyst nanoparticles, where the CNTs are highly dense, substantially pure and relatively uniform in diameter. In particular, CNTs are formed on the surfaces of the metal catalyst particles, in accordance with the invention, having dimensions of no greater than about 10 nm diameter and as large as a few microns or greater in length.

The methods of the invention employ a continuous process, including a first step in which metal aerosol particles are formed and a second step in which CNTs are grown on the surfaces of the particles. In the first step of the process, aerosol metal composite (e.g., bimetallic) catalyst nanoparticles are formed via a spray pyrolysis method in which at least two metallic salts are thermally decomposed. The metallic catalyst nanoparticles preferably include at least one metal catalyst (e.g., iron, nickel or cobalt) and at least one non-catalyst metal (e.g., aluminum). As used herein, the term "catalyst" refers to a metal that catalyzes (i.e., enhances and/or accelerates) the cracking or thermal decomposition of a hydrocarbon compound to facilitate formation of CNTs on the surface of metal particles, whereas the term "non-catalyst" refers to a metal that, by itself, does not catalyze such cracking or thermal decomposition of the hydrocarbon compound.

The aerosol metal composite catalyst particles formed by spray pyrolysis are then reacted with a suitable hydrocarbon compound (e.g., acetylene, ethylene or ethanol) in a suitable thermal reactor to facilitate growth of CNTs on the metal composite catalyst particles.

The process of the invention yields relatively uniform CNTs on the surface of the aerosol metal composite nanoparticles in the gas phase. As determined by transmission electron microscope (TEM) imaging, the process results in the formation of unique hybrid metal particle/CNT structures that have shapes resembling a "sea urchin"-like structure. The "sea urchin" structures have CNTs extending from the surfaces of the metal particles.

Carbon nanotubes can be removed or released from the metal particles, with the metal particles then being separated from the CNTs via application of a magnetic field or by centrifugation so as to yield substantially pure and non-agglomerated or generally untangled CNTs. Alternatively, the hybrid metal particle/CNT or "sea urchin" structures, which are stable, can be kept intact for use in certain applications.

The methods and corresponding structures formed in accordance with the invention provide a number of advantages over conventional CNT formation methods including, without limitation:

1. The formation of large metal composite catalyst particles (e.g., bimetallic catalyst particles) on which CNTs grow, where the larger catalyst particle structure poses less environmental, health and safety hazards in comparison to conventional CNT formation techniques in which smaller metal catalyst structures are utilized.

2. The anchoring of bundles of CNTs on catalyst particles minimizes the potential aggregation of the CNTs, and release of the CNTs from the particles can be carefully controlled under appropriate conditions to yield substantially untangled CNTs.

3. The CNTs can be easily released or removed from the catalyst particles (e.g., via an acid etch process described below) and directly suspended in an aqueous and surfactant-free solvent, or the CNTs can remain attached to the catalyst particles in the hybrid metal particle/CNT or "sea urchin" structure. The "sea urchin" structure formed by the process is stable and useful in certain applications (e.g., enhancing thermal conductivity in nanofluids).

An exemplary method is described below, in which the hybrid metal composite/CNT or "sea urchin" structures were formed in accordance with the invention by reacting Fe/Al composite catalyst particles with acetylene ($C_2H_2$) so as to grow CNTs on the composite catalyst particles. The "sea urchin" structures were formed on metal composite catalyst particles having varying amounts of iron and aluminum. For comparison purposes, the same method was also carried out using single metal catalyst particles of iron, in which a thin layer of amorphous carbon formed on the iron particles rather than CNTs.

A number of different precursor solutions of metallic salts were prepared by dissolving $Fe(NO_3)_3$ non-hydrated and/or $Al(NO_3)_3$ non-hydrated in deionized water at a total concentration of 3% by weight, where the ratios of iron nitrate to aluminum nitrate (i.e., $Fe(NO_3)_3$: $Al(NO_3)_3$) in the precursor solutions were as follows: 1:0 (i.e., no $Al(NO_3)_3$), 1:1, 1:2, 1:5 and 0:1 (i.e., no $Fe(NO_3)_3$).

In a first step of the method, aerosol particles of iron, aluminum, and iron/aluminum composites were formed from thermal decomposition of each of the precursor solutions containing the non-hydrated iron and/or aluminum salts at the varying ratios as noted above. A Collison nebulizer was utilized to provide a droplet flow rate for each of the precursor solutions at about 1 liter/min in a carrier gas of nitrogen (provided at a pressure of about 10 psi). The metal nitrate containing aerosol droplets formed from the nebulizer were passed through a silica-gel dryer to remove water, thus forming dried metal nitrate aerosol particles.

The dried solid metal nitrate aerosol particles emerging from the dryer were then mixed with hydrogen to create a reducing environment necessary to remove oxygen from the particles so as to form metal particles. In particular, the metal nitrate aerosol particles were mixed with hydrogen delivered at a flow rate of about 75 sccm to a first tube furnace of suitable dimensions (e.g., about 50 cm in length and about 2.54 cm in diameter). The mixture was heated in the first tube furnace at a suitable temperature (e.g., in the range of about 1000° C.) to achieve pyrolytic conversion of the metal nitrate particles to crystalline metal aerosol particles. It is noted that $Al(NO_3)_3$ and $Fe(NO_3)_3$ are known to thermally decompose at about 150° C. and 125° C., respectively. Metal composite aerosol particles of Fe/Al were formed from the precursor solutions including varying ratios of Fe(NO$_3$)$_3$ to Al(NO$_3$)$_3$, while single metal aerosol particles of Fe and Al were formed from the precursor solutions including only Fe(NO$_3$)$_3$ or Al(NO$_3$)$_3$.

The metal aerosol particles that were formed in the first tube furnace were then introduced into a second tube furnace having suitable dimensions (e.g., about 60 cm in length and about 2.54 cm in diameter). The metal aerosol particles were reacted with a mixture of acetylene flowing into the furnace at about 15 sccm and hydrogen flowing into the furnace at about 100 sccm to facilitate catalytic growth of carbon nanostructures on the free floating metal catalyst particles. The temperature of the second tube furnace was in the range of about 750° C. Carbon nanotubes, as characterized in detail below, were grown by CVD on the Fe/Al composite particles in the second tube furnace to form the hybrid metal particle/CNT or "sea urchin" like structures of the invention. The single metal Fe catalyst particles did not grow CNTs, but rather became encapsulated with carbon as a result of the reaction with acetylene in the second tube furnace.

A number of different analysis techniques were performed at different stages of the process described above so as to adequately characterize the metal catalyst particles formed both before and after reaction with acetylene. These analysis techniques are described below.

The metal oxide particles generated by spray pyrolysis (at about 1000° C.) according to the method described were analyzed using X-ray diffraction methods, with the measured X-ray diffraction (XRD) patterns being shown in the plot of FIG. 1. In particular, the plotted spectra, which are designated as a, b, c, and d in FIG. 1, respectively refer to metal oxide particles formed from the 3 wt % precursor solutions with Fe(NO$_3$)$_3$:Al(NO$_3$)$_3$ mixing ratios of 1:0, 1:1, 1:5, and 0:1. The spectral data shows very strong diffraction for the iron oxide particles in the absence of aluminum oxide (i.e., plot a), where these iron oxide particles have a crystallite size (estimated using Scherrer's equation) of about 2 nm. In contrast, low-intensity broad spectra were observed for the composite particles of iron and aluminum oxides (plots b and c) and also the aluminum oxide particles (plot d). The XRD spectral data confirms that composite Fe/Al particles are formed utilizing the spray pyrolysis method described above in which varying amounts of Fe(NO$_3$)$_3$ and Al(NO$_3$)$_3$ are provided in the precursor solution, where the structure of the composite particles appears to be one of the following: (i) iron oxide (guest) crystallites formed inside an aluminum oxide (host) matrix, such that the iron oxide crystallites were too small to be detected; or (ii) iron and aluminum oxides were crystallized simultaneously to form single phase Al$_x$Fe$_{(2-x)}$O$_3$, which is amorphous in structure.

To verify and characterize the gas-phase growth of CNT structures on metal particles produced by the method described above, a differential mobility analyzer (DMA) (Model 3081, TSI, Inc.) combined with a condensation nucleus counter (CNC) (Model 3025A, TSI, Inc.) was utilized to obtain a real-time measurement of the mobility size distribution of the resultant nanostructured aerosol materials formed in the second tube furnace. Utilizing this technique, the size change of the metal composite aerosol particles was monitored in real-time as CNTs were grown on such particles. The DMA and CNC were connected downstream to receive materials emerging from the second tube furnace.

Prior to delivery to the DMA, the nanostructured aerosol materials were given a Boltzmann charge distribution by passing the materials through a radioactive ionizing source (Po-210). It is noted that the charged aerosol is classified by electrical mobility from a balance of electrostatic and drag forces, and that the measurement of mobility size relates to the aerodynamic drag on the particle. The classified aerosol of a given mobility diameter was subsequently counted with the CNC, which grows particles via heterogeneous condensation of supersaturated butanol into a size amenable for optical detection.

Figure 2A:
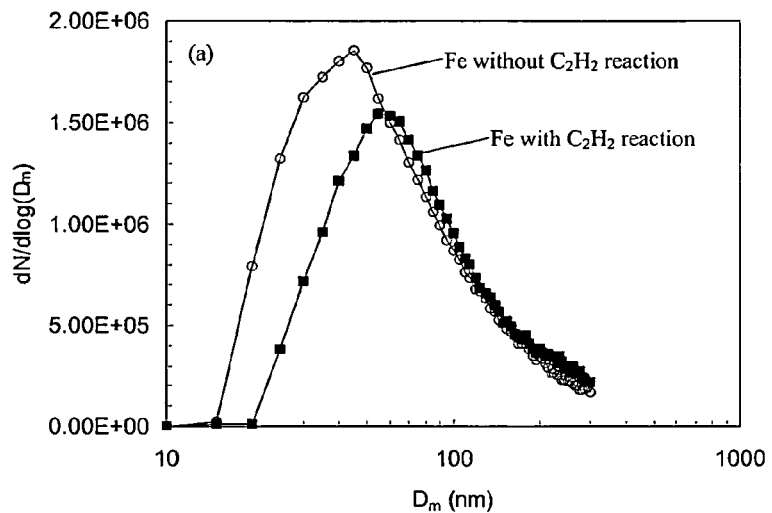
FIGS. 2A and 2B are plots of mobility size distribution for iron metal particles and iron and aluminum metal composite particles with and without reaction with acetylene.
Figure 2B:
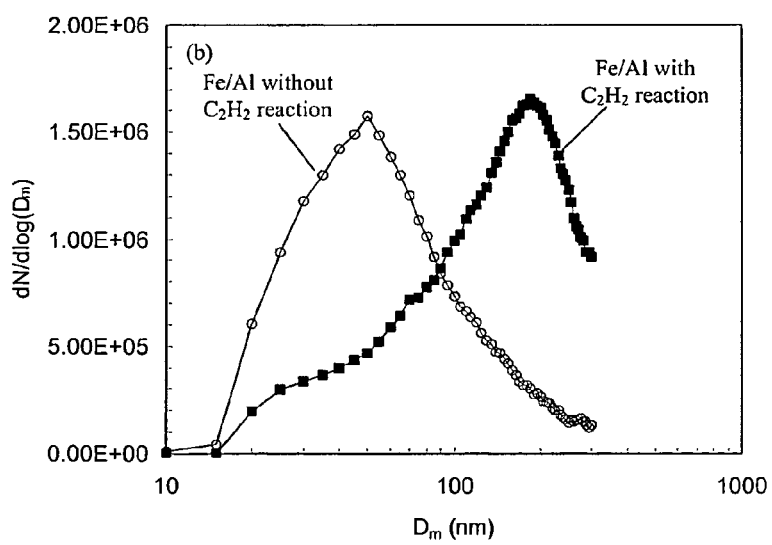

The measurement of the size distribution of Fe and Fe/Al metal particles before and after reaction with acetylene is plotted in FIGS. 2A and 2B, where FIG. 2A represents size distribution of iron particles and FIG. 2B represents size distribution of composite Fe/Al particles. Prior to reaction with acetylene, a broad size distribution of either pure Fe particles (FIG. 2A) or Fe/Al composite particles (FIG. 2B) was observed, with the number mean diameter of about 55 nm and geometric standard deviation of about 1.7. After the metal particles were reacted with acetylene, there was only a slight increase in number mean diameter of pure Fe aerosol particles to about 70 nm (FIG. 2A).

In contrast, a dramatic size increase can be seen for the Fe/Al composite aerosol particles after reaction with acetylene, where the number mean diameter increased to about 200 nm (FIG. 2B). The mobility size distribution data further indicated that no smaller sized particles (e.g., particles less than about 20 nm in diameter) were observed as would be expected if the temperatures were high enough to thermally crack the hydrocarbon leading to homogeneous nucleation. This indicates that, in the method described above, acetylene has reacted only heterogeneously with the metal aerosols.

Figure 3:
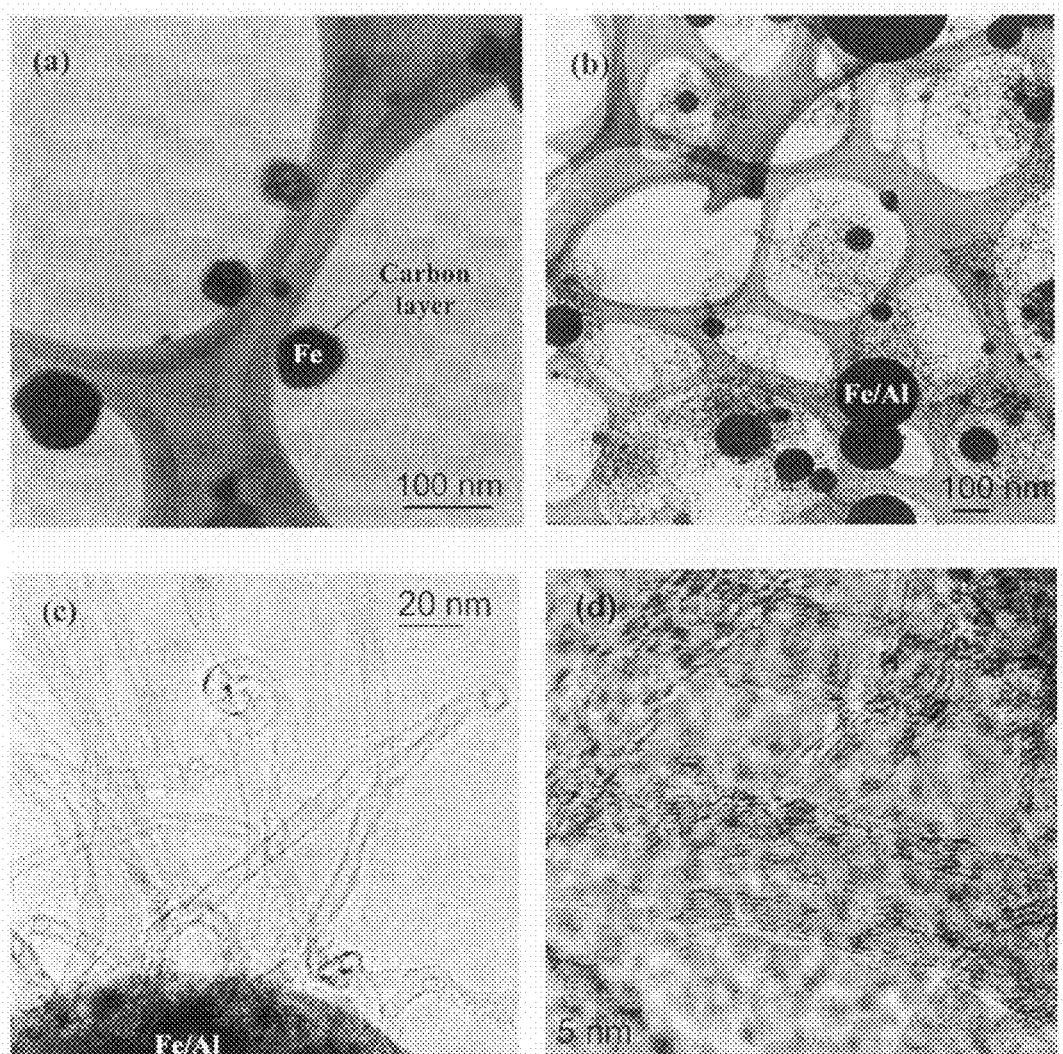
FIG. 3 shows TEM images of iron metal particles after reaction with acetylene and also iron/aluminum metal composite particles with carbon nanotubes grown on such particles after reaction with acetylene in accordance with the present invention.

The aerosol particulate materials from the second tube furnace were also collected by gas-phase electrostatic precipitation on a transmission electron microscope (TEM) grid, so as to facilitate TEM analysis of these materials. The TEM imaging of the different aerosol particle materials after reaction with acetylene is shown in the various panels of FIG. 3. In particular, the image panel labeled (a) in FIG. 3 shows a TEM image of iron aerosol catalyst particles after reaction with acetylene and hydrogen, which resulted in growth of a thin carbon layer. The average core diameter of the iron particles was determined to be about 55 nm (with a standard deviation of about 5 nm), which is consistent with the DMA measurements for the pure unreacted iron particles (as plotted in FIG. 2A). The outer thin carbon layer was determined to be about 10 nm (with a standard deviation of about 3 nm), which is consistent with the growth in average particle size for the iron particles upon reaction with acetylene as indicated by DMA analysis (FIG. 2A). Thus, the TEM imaging reveals that the catalytic cracking of acetylene leads to catalytic coking of the iron aerosol particles and deposition of amorphous carbon on the iron particles.

In contrast, TEM imaging for the Fe/Al composite particles reacted with acetylene reveals the formation of CNTs on the surfaces of such particles, resulting in the formation of unique "sea urchin"-like structures as can be seen in image panels (b) and (c) of FIG. 3. In particular, a dense matting growth of CNTs with relatively uniform diameters of no greater than about 10 nm can be seen over the surfaces of Fe/Al composite particles. The CNTs grown on the particle surfaces are as large as a few microns or greater in length. In addition, the high resolution TEM (HRTEM) image in panel (d) of FIG. 3 shows the formation of multi-walled CNTs (MWCNTs) on the Fe/Al composite particles, where the MWCNTs have outer diameters of no greater than about 10 nm and include up to about 5 walls and a hollow core.

Thus, in accordance with the invention, the formation of hybrid metal composite/CNT or "sea urchin" structures is possible by catalytic cracking and CVD deposition of a suitable hydrocarbon compound (e.g., acetylene) in the presence of composite metal particles including at least two different metals (e.g., iron and aluminum), where one metal serves as a catalyst for cracking or thermal decomposition of the hydrocarbon and formation of CNTs, while another metal is non-catalytic with respect to the thermal decomposition of the hydrocarbon. However, the use of a single metal catalyst particle (e.g., iron) results in catalytic coking of the particle, inhibiting the formation of CNTs.

One possibility for the different result when using the Fe/Al composite particles as opposed to Fe single metal particles may be that the non-catalytic aluminum in the metal composite particles forces the creation of small iron domains, which in turn facilitates CNT growth rather than coking of the iron particle surface and establishes open space for continuous acetylene sequestering of carbon.

It has further been determined that the density of CNTs formed using composite metal particles, such as the binary or bimetallic particle structure described above, can be effectively controlled by controlling the density of active catalyst sites in the particles that are available for CNT growth. In the Fe/Al binary particle system that is formed by the method described above, the density of Fe sites can be controlled by the amount of iron and aluminum nitrates that are provided in aqueous solvent during the spray pyrolysis/metal particle formation process. This can be seen from scanning electron microscope (SEM) images obtained for hybrid composite metal particle/CNT structures formed from precursor solutions having varying ratios of iron nitrate to aluminum nitrate.

Thus, the metal composite particles include a plurality of discrete catalyst metal domains or active catalyst sites dispersed throughout a non-catalytic metal portion. The resulting composite metal particle/CNT structure, or "sea urchin" structure, includes a plurality of spaced carbon nanotube structures anchored to and radiating outwardly from the active catalyst sites or domains on the surfaces of the metal composite particles.

Figure 4:
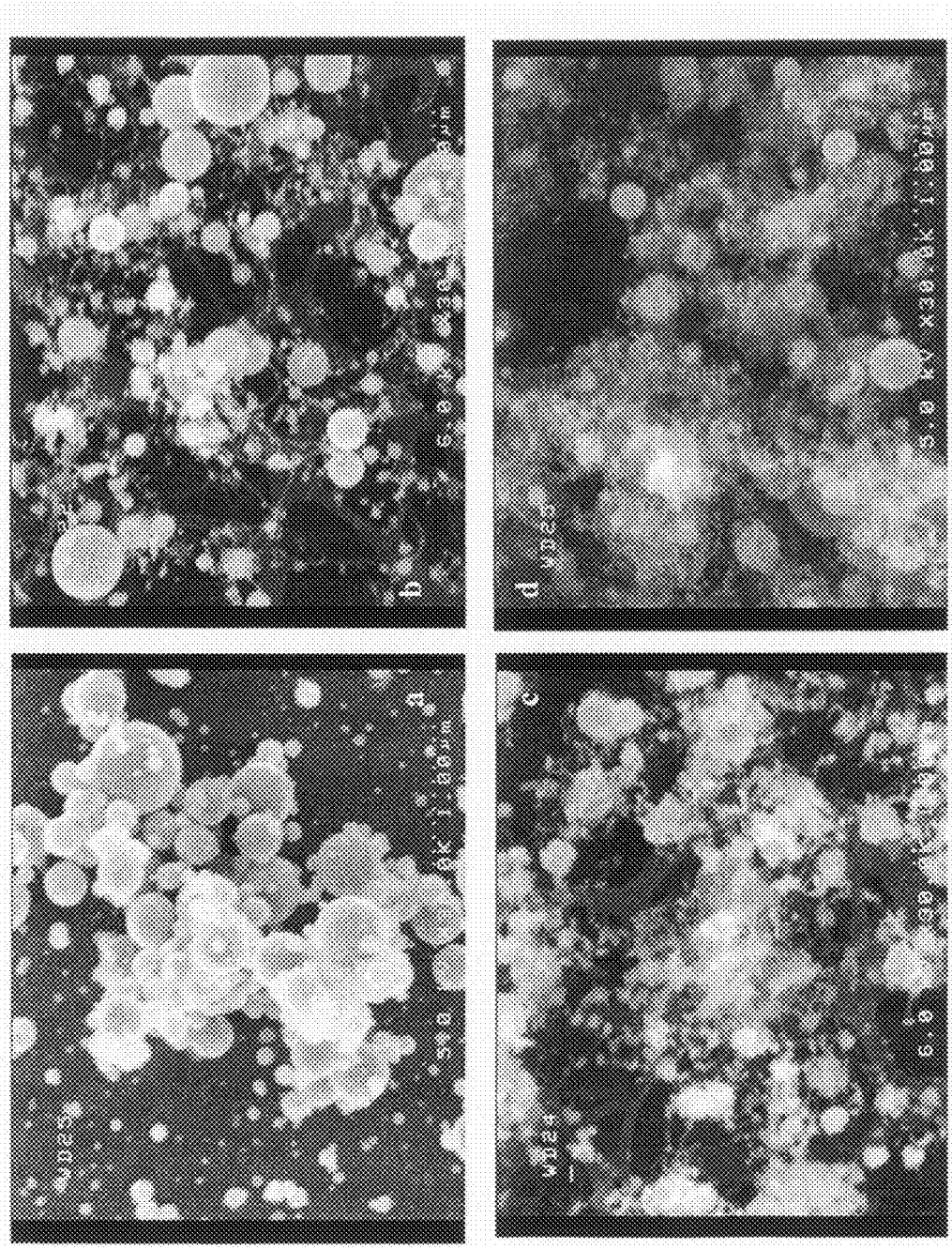
FIG. 4 shows SEM images of carbon nanotube structures grown on metal composite catalyst particles having varying ratios of iron and aluminum.

In particular, FIG. 4 depicts four SEM images as panels (a)-(d), which respectively show structures formed using precursor solutions having $Fe(NO_3)_3$:$Al(NO_3)_3$ mixing ratios of 0:1 (panel (a)), 1:5 (panel (b)), 1:2 (panel (c)), and 1:1 (panel (d)). As can be seen from the various image panels of FIG. 4, the density of CNTs formed increases with decreasing Al concentration in the Fe:Al ratio. When the iron concentration is too low, little or no CNT growth occurs on the particles.

The effect of Fe:Al ratio in the particles on CNT growth and density may be due, at least in part, to the nature of the precipitation of the metal nitrate precursors in the metal nitrate droplets formed, which also affects the metal distribution within the final metal aerosol particles. The solubility of aluminum nitrate (82 g of $Al(NO_3)_3$/100 g of $H_2O$) is less than the solubility of iron nitrate (138 g of $Fe(NO_3)_3$/100 g of $H_2O$), indicating that the aluminum nitrate precursor likely precipitates out first as water is evaporated during drying of the metal nitrate particles. Precipitation will preferentially occur at the surface of the droplet where the solute concentration is highest. Therefore, aluminum becomes enriched at the particle surface relative to iron during drying of the particle, which in turn facilitates CNT growth and the prevention of coking (which occurs with the single metal iron catalyst particle).

During pyrolysis of the $Fe(NO_3)_3$ aerosol particles, the iron oxide is reduced in hydrogen to form pure Fe particles, which subsequently react with acetylene to create a thin carbon passivation layer. However, for the pyrolysis of the composite of $Fe(NO_3)_3$ and $Al(NO_3)_3$ particles, the growth pathway appears to be more complicated due to the nature of precipitation. In particular, the aerosol droplets containing the Fe/Al metal nitrate salts lose solvent early on in the drying process, and the solute concentration can reach a supersaturated state and begin to nucleate in the drop. Since the evaporation of solvent occurs at the droplet surface, the metal nitrate will be in the highest concentration at the surface. As noted above, $Al(NO_3)_3$ has a lower solubility in comparison to $Fe(NO_3)_3$, such that a 1:1 mixture of the two nitrates in the precursor solution will tend to promote the initial nucleation at the surface of the aluminum and the surface becomes enriched in aluminum.

Thus, an increase in the initial concentration of $Al(NO_3)_3$ relative to $Fe(NO_3)_3$ in the precursor solution would likely further promote surface enrichment of the aluminum, resulting in a decrease in the size of the $Fe(NO_3)_3$ crystals and a corresponding decrease in iron catalyst at the particle surface. Thus, by controlling the ratio of iron nitrate to aluminum nitrate in the precursor solution, the surface catalyst size of the resultant composite metal particles formed can be tuned so as to selectively control the size and density of CNTs grown on the particles.

As noted above, the CNTs can be released from the metal particles via any one or more suitable methods, such as an acid etching process. For example, a strong acid, such as nitric acid ($HNO_3$), can be used to etch the metal components so as to release the CNTs. The acid etching process further enables the CNTs to be homogenously dispersed or suspended in surfactant-free aqueous solutions, since the nitric acid-assisted chemical oxidation creates a hydrophilic surface for the CNTs.

In an exemplary method, 30 milligrams of Fe/Al composite metal particle/CNT structures formed according to the method described above were refluxed for one hour in 40 ml of 15M nitric acid and then filtered on a membrane filter and washed with deionized water to remove any residual acid from the structures. The resulting CNTs collected on the membrane filter were dried at about 100° C. for about 4 hours, followed by sonication in deionized water for about 2 hours.

Figure 5:
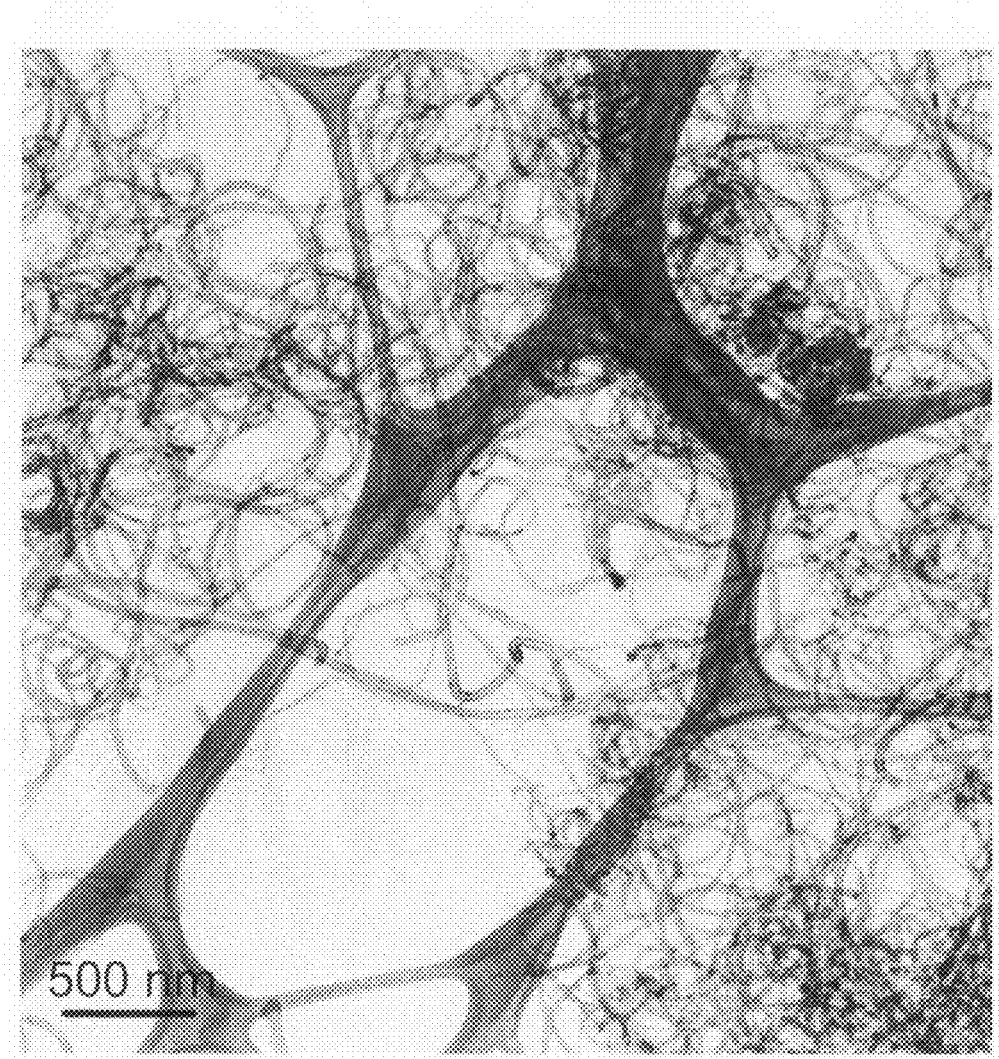
FIG. 5 shows a TEM image of carbon nanotube structures formed in accordance with the present invention and after being released and separated from the metal composite particles.

A TEM image of the acid-treated CNTs is shown as FIG. 5, in which it can be seen that the CNTs have been released from the Fe/Al composite metal particles and are present as a substantially homogeneous suspension in surfactant-free water. The acid-treated CNTs were further maintained as a stable suspension in water for 2 to 3 months without sedimentation.

Alternatively, the composite metal/CNT hybrid or "sea urchin" structures formed in accordance with the invention can be maintained intact for use in certain application. An exemplary application for the CNT "sea urchin" structures is for the enhancement of thermal conductivity of certain fluids. A study was conducted in which the nanofluid thermal conductivity in poly-alpha-olefin (PAO) oil was measured over a wide temperature range from 10° C. to 90° C. when the composite metal/CNT hybrid structures of the invention were added to oil. The thermal conductivity of the oil was increased by 20% at room temperature, where the oil included volume fractions of less than 0.2% of the composite metal/CNT hybrid particles.

The composite metal/CNT hybrid particles of the invention enhance conductivity of the PAO oil to a much greater extent in comparison to spheres or other conventionally formed carbon nanotubes at the same loading levels within the PAO oil. For example, the hybrid particles were found to enhance the conductivity of the PAO in an amount that was about 13 times greater than spherical alumina nanoparticles at 0.2 vol % within the oil. The enhanced thermal conductivity in nanofluids containing the hybrid metal composite/CNT or "sea urchin" particles of the invention is due to both particle Brownian motion within the fluids and the high-aspect-ratio and high thermal conductivity of the CNTs located on the particle surfaces.

Thus, the present invention provides simple, effective and safe methods of producing density-controlled and substantially pure CNTs on free-flowing composite metal aerosol nanoparticles, where the composite metal particles include at least one metal that catalyzes the reaction of a hydrocarbon compound to form CNTs and a metal that is non-catalytic to such reaction. The methods provide the combined advantages of forming aerosol particles via continuous production methods and a substrate grown approach for CNTs, where the CNTs can be released at a selected time and under selected conditions. By combining spray pyrolysis and thermal CVD processes, relatively uniform CNTs (e.g., multi-walled CNTs) with diameters of less than about 10 nm can be formed on the composite metal aerosol nanoparticles, which facilitate the potential for high volume production of CNTs requiring a low residence time in the reactor (e.g., about 3 seconds or less).

Further, unique "sea urchin" CNT structures are formed using the methods of the invention without any soot or amorphous carbon contamination agglomerated with the CNTs. The "sea urchin" CNT structures are stable and can be kept in tact for use in certain applications. Exemplary applications in which the "sea urchin" CNT structures of the invention can be used include, without limitation, enhancing fluid conductivity (as noted above), electrical conduction, and for use in reinforcing polymer composites.

Alternatively, the CNTs can be released or removed from the supporting metal catalyst particle surfaces to yield CNTs that can be used for a variety of different applications. The CNTs bound to the metal particles can be easily manipulated without the concern of high mobility of conventional nanowires and then subsequently released from the metal catalyst particles at the desired time and under the desired conditions in a substantially non-agglomerated state.

Having described exemplary embodiments for forming carbon nanotube structures on free floating substrates, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed:

1. A method of forming carbon nanotube structures comprising:

providing free floating metal composite particles, each of the metal composite particles including a plurality of discrete catalyst metal domains dispersed throughout and surrounded by and a non-catalyst metal portion, wherein the metal composite particles are formed by drying a metal salt solution comprising catalyst metal salts and non-catalyst metal salts, and the catalyst metal catalyzes the decomposition of a hydrocarbon compound and the formation of carbon nanotube structures on surfaces of the particles; and combining the metal composite particles with the hydrocarbon compound in a heated environment and thereby forming a plurality of carbon nanotube structures anchored to and radiating outwardly from the catalyst metal domains on the surfaces of the metal composite particles.

2. The method of claim 1, wherein the catalyst metal comprises iron and the non-catalyst metal comprises aluminum.

3. The method of claim 2, wherein the metal composite particles are formed by spray pyrolysis of a metal salt solution comprising iron and aluminum salts so as to form crystalline metal aerosol particles.

4. The method of claim 1, wherein the hydrocarbon compound comprises acetylene.

5. The method of claim 1, wherein the metal salt solution comprises $Fe(NO_3)_3$ and $Al(NO_3)_3$.

6. The method of claim 5, further comprising:

controlling a size of carbon nanotube structures formed on the surfaces of the metal composite particles by controlling the ratio of $Fe(NO_3)_3$ and $Al(NO_3)_3$ in the metal salt solution.

7. The method of claim 1, further comprising:

removing the carbon nanotube structures from the surfaces of the metal composite particles.

8. The method of claim 7, wherein the removal of the carbon nanotube structures from the surfaces of the metal composite particles comprises immersing the metal composite particles with carbon nanotube structures in an acidic solution.

9. The method of claim 8, wherein the acidic solution comprises nitric acid.

10. The method of claim 7, wherein the carbon nanotube structures are removed from the surfaces of the metal composite particles via application of a magnetic field.

11. The method of claim 7, wherein the carbon nanotube structures are removed from the surface of the metal composite particles via centrifugation.

12. The method of claim 1, wherein the carbon nanotube structures formed have diameters no greater than about 10 nm.

13. The method of claim 1, wherein the carbon nanotube structures are multi-walled.

14. A method of enhancing the electrical conductivity of a substance comprising mixing a selected amount of metal composite particles with the substance, wherein the metal composite particles include carbon nanotube structures formed on the surfaces of the particles in accordance with the following method steps:

providing metal composite particles, each of the metal composite particles including a plurality of discrete catalyst metal domains dispersed throughout and surrounded by a non-catalyst metal portion, wherein the metal composite particles are formed by drying of a metal salt solution comprising catalyst metal salts and non-catalyst metal salts, and the catalyst metal catalyzes the decomposition of a hydrocarbon compound and the formation of carbon nanotube structures on surfaces of the particles; and combining the metal composite particles with the hydrocarbon compound in a heated environment and thereby forming a plurality of substantially untangled carbon nanotube structures anchored to and radiating outwardly from the catalyst metal domains on the surfaces of the metal composite particles.

15. The method of claim 14, wherein the substance comprises a fluid.

16. The method of claim 15, wherein the fluid comprises a poly-alpha-olefin oil.

17. A method of forming carbon nanotube structures comprising:

converting catalyst metal salt particles and non-catalyst metal salt particles to crystalline metal aerosol particles comprising the catalyst metal and the non-catalyst metal, the catalyst metal forming a plurality of spaced active catalyst sites, wherein the catalyst metal catalyzes the decomposition of a hydrocarbon compound and the formation of carbon nanotube structures on surfaces of the particles; and combining the metal composite particles with the hydrocarbon compound in a heated environment and thereby forming a plurality of spaced carbon nanotube structures anchored to and radiating outwardly from the active catalyst sites on the surfaces of the metal composite particles.

18. The method of claim 17, comprising the further step of removing the carbon nanotube structures from the surfaces of the metal composite particles.

19. The method of claim 18, wherein the carbon nanotube structures are removed from the surfaces of the metal composite particles via application of a magnetic field.

20. The method of claim 18, wherein the carbon nanotube structures are removed from the surface of the metal composite particles via centrifugation.

\* \* \* \* \*